Aug. 24, 1965
J. C. MARINACE
3,202,913
HIGH SENSITIVITY HALL EFFECT PROBE
Filed May 29. 1961
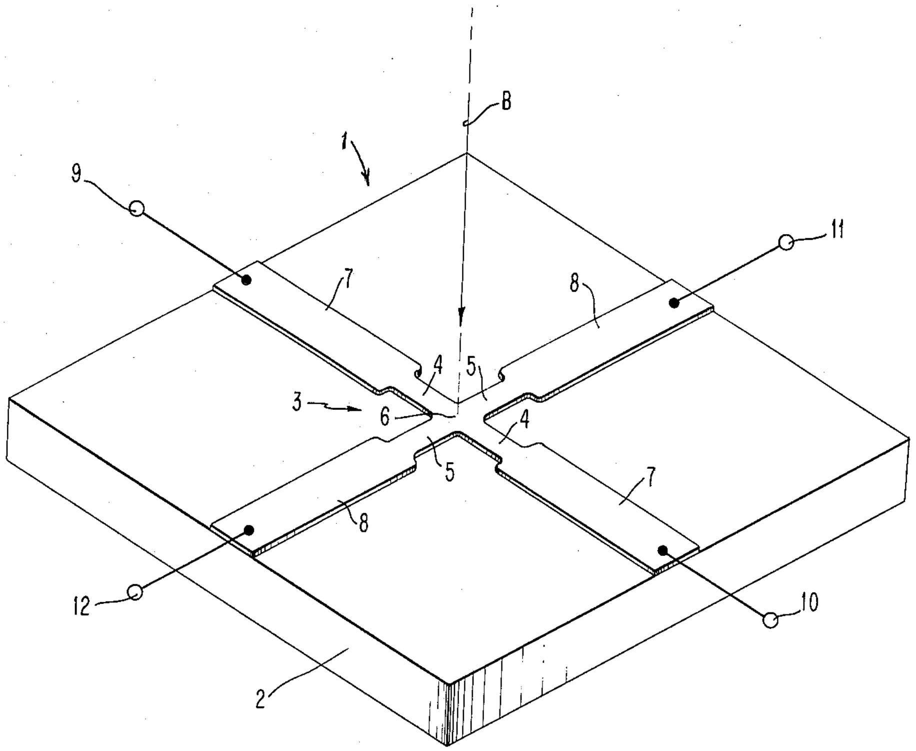
INVENTOR
JOHN C. MARINACE
BY John F. [signature]
ATTORNEY United States Patent Office 3,202,913

Patented Aug. 24, 1965

3,202,913
HIGH SENSITIVITY HALL EFFECT PROBE

John C. Marinace, Yorktown Heights, N.Y., assignor to International Business Machines Corporation, New York, N.Y., a corporation of New York Filed May 29, 1961, Ser. No. 113,444
4 Claims. (Cl. 324—45)

This invention relates to apparatus for measuring and detecting magnetic fields and, more particularly, to probes which utilize the Hall effect for measuring and detecting magnetic fields.

The Hall effect may be described briefly as a phenomenon which induces, along one of two axes lying in the plane of a conductive material which constitutes the vital Hall region of the probe, a voltage which is proportional to a current which is caused to flow through the other of the two axes and is proportional to a magnetic field which is directed along a third axis perpendicular to the other two.

The magnitude of the Hall potential is given by the equation:

$$V_H = \frac{IH}{t} R_H$$

where $V_H$ is the induced Hall voltage along one of the two axes, I is the current which flows through the other of the two axes in the plane of the Hall region, H is the magnetic field strength along the third axis, $t$ is the thickness of the Hall effect region, and $R_H$ is the Hall coefficient. From the formula it can be seen that increasing the Hall coefficient $R_H$ or decreasing the thickness of the Hall effect region will produce an increase in the induced Hall voltage for a given I and H.

Although the prior art has been successful in producing thin Hall effect regions where, for example, the region is obtained by depositing a semiconductor material such as germanium or bismuth onto a glass surface, the character of the deposited material is such that the optimum Hall coefficient is not realized. When such a semiconductor material is deposited in an amorphous state onto glass, as described in U.S. Patent 2,914,728, although a crystalline structure may thereafter be obtained by well-known techniques, monocrystallinity is not realized. This is so because the mechanism of the process therein described is not susceptible of yielding an epitaxial relationship between the deposited material and the substrate. The magnitude of the Hall coefficient depends importantly upon the character of the material which forms the conductive region of the probe as can be seen from the formula for the Hall coefficient, which is $R_H = \mu\rho$. For monocrystalline material the mobility $\mu$ is much higher than for polycrystalline material. Thus, it will be appreciated that where the material forming the conductive region is deposited in such a way as to be epitaxially related to a monocrystalline substrate, the deposited material will be monocrystalline; and, hence the Hall coefficient will be improved thereby yielding a high magnitude Hall potential. Most importantly, however, the conductive region must be in the form of a thin layer and the substrate region must act as an insulator.

It is, therefore, a principal object of the present invention to detect and measure very weak magnetic fields.

Another object is to produce a high magnitude of Hall potential responsive to these magnetic fields.

Another object is to provide a Hall effect probe wherein the conductive region is made very thin and is monocrystalline in character.

A further object is to provide a Hall effect device wherein the thin conductive layer is epitaxially related to a high resistivity monocrystalline substrate acting as an insulator.

The foregoing and other objects, features and advantages of the invention will be apparent from the following more particular description of a preferred embodiment of the invention, as illustrated in the accompanying drawing.

The figure shows a Hall effect probe which embodies the principle of the present invention.

The present invention will be explained with reference to the figure where there is shown a Hall effect probe generally designated 1, comprised of a substrate 2 of a semiconductor material, such as gallium arsenide, which serves as an insulating material supporting the conductive region generally designated 3. The thin layer or film of conductive material constituting the region 3 is produced in the particular geometry shown by a vapor deposition technique previously described in application Serial No. 824,115 issued January 8, 1963, as U.S. Patent No. 3,072,507. A suitable material to serve as the thin region is germanium. By a masking technique, the thin conductive region 3 is formed in a cross shape with the arms 4 and 5 intersecting at right angles and with the sections 7 and 8 constituting extensions of these arms. The region labeled 6 at the intersection is the vital Hall effect area of the apparatus. To the section 7 suitable conductors labeled 9 and 10 are attached in order to provide current flow through one axis of the Hall area from a source not shown. The arrow labeled B represents a magnetic field applied perpendicularly to the Hall effect area 6. Suitable conductors 11 and 12 are also attached to the sections 8 in order to take off the induced Hall voltage. The fact that the electrical connections are made at a point removed from the vital Hall region is advantageous to reduce certain deleterious galvanic and thermal effects.

The process whereby the thin layer of germanium is epitaxially deposited onto the high resistivity gallium arsenide has been generally described in the aforesaid application Serial No. 824,115. The particulars of the procedure to be followed in accordance with the present invention are detailed below.

After cleaning of the substrate, a mask is placed upon the top surface thereof. The gallium arsenide substrate 2 has a resistivity, which is advantageously selected to be on the order of 5 megohm-cm. or higher, whereby the substrate may serve as an insulator. In suitable reaction apparatus containing a halogen such as iodine, a source of germanium is positioned at a first temperature zone and the substrate 2 is situated at a second zone of lowered temperature. With the temperature profile suitably chosen, a disproportionation reaction is effected whereby germanium diiodide is produced in the first zone and germanium tetraiodide and germanium are produced in the second zone. The free germanium yield in the lowered temperature zone deposits epitaxially onto the substrate 2 whereby a thin monocrystalline layer, 3 in the configuration shown, is obtained. The layer 3 may be deposited to have a thickness on the order of microns or less, as desired.

Although reference has been made to the use of gallium arsenide for the high resistivity substrate and to germanium for the deposited layer, it will be apparent to those versed in the art that other materials may be selected to provide the requisite insulative and conductive portions of a Hall effect probe realizable from the teaching of the present invention.

While the invention has been particularly shown and described with reference to a preferred embodiment thereof, it will be understood by those skilled in the art that various changes in form and details may be made therein without departing from the spirit and scope of the invention.

What is claimed is:

1. A high sensitivity Hall effect probe for use in sensing magnetic fields comprising a monocrystalline substrate of semiconductor material, having a resistivity on the order of at least 1 megohm-cm., serving as an insulative support; a thin monocrystalline conductive layer of semiconductor material on said substrate having a resistivity less than 1 megohm-cm., said thin layer having an epitaxial relationship with said substrate, said thin layer having a configuration with arm portions lying in the plane of said thin layer whose axes intersect at right angles, said configuration having an area of intersection which provides a Hall voltage when subjected to the effect of electrical and magnetic forces.

2. A high sensitivity Hall effect probe as defined in claim 1 wherein said thin layer is constituted of germanium.

3. A high sensitivity Hall effect probe as defined in claim 2 wherein said substrate is constituted of gallium arsenide.

4. A high sensitivity Hall effect probe for use in sensing magnetic fields comprising a monocrystalline substrate of semiconductor material having a relatively high resistivity serving as an insulative support, a thin monocrystalline conductive layer of semiconductor material having a relatively low resistivity on said substrate, said thin layer having an epitaxial relationship with said substrate, said layer having configuration with arm portions lying in the plane of said thin layer whose axes intersect, and said configuration having an area of intersection which provides a Hall voltage when subjected to the effect of electrical and magnetic forces.

References Cited by the Examiner

UNITED STATES PATENTS

| | | | |
|---|---|---|---|
| 2,914,728 | 11/59 | Brophy et al. | 324—45 |

FOREIGN PATENTS

| | | |
|---|---|---|
| 1,029,941 | 5/58 | Germany. |

WALTER L. CARLSON, *Primary Examiner.*

FREDERICK M. STRADER, *Examiner.*